2,174,840

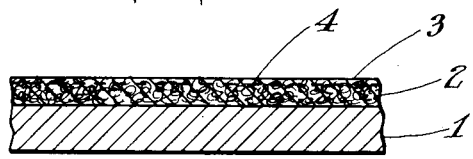
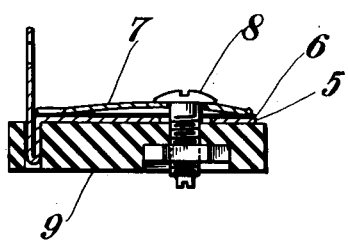
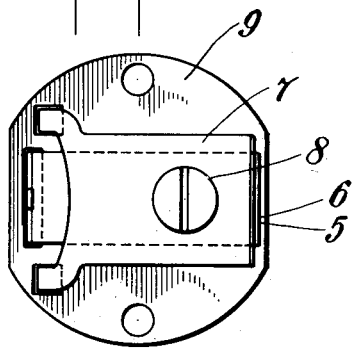
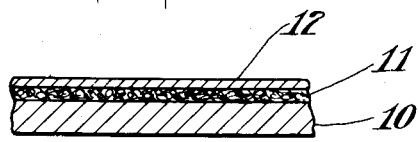
INVENTORS
P. ROBINSON & W. MALLISON
BY
Dorsey & Cole
ATTORNEYS Patented Oct. 3, 1939

UNITED STATES PATENT OFFICE 2,174,840

ELECTRICAL CONDENSER

Preston Robinson, Williamstown, and William M. Allison, North Adams, Mass., assignors to Sprague Specialties Company, North Adams, Mass., a corporation of Massachusetts Application February 10, 1936, Serial No. 63,248

3 Claims. (Cl. 175—41.5)

The present invention relates to electrical condensers in which one of the electrodes is of filming metal and the dielectric is a film formed on the filming electrode, and to the process of making such condensers.

The condensers according to the invention, while having an electrolytically-formed film, are not electrolytic condensers, but solid dielectric type condensers, the film being a substantially dry film, the film-maintaining electrolyte being absent and the second electrode of the condenser being a metallic conductor and not an electrolyte, as is the case in electrolytic condensers.

We are aware that it has been suggested before to use as the dielectric of electrical condensers a dry film formed on a filming metal electrode. Such past attempts, however, failed because of the poor dielectric quality for such a use of the films so far employed.

The films made according to the invention, however, are excellent dielectrics for such condensers, and also maintain their excellence in the absence of a film-maintaining electrolyte. It should be noted that while some of the steps used in the manufacture of these dielectric films are similar to steps used in the manufacture of corrosion-preventing layers on aluminum, sometimes also used in the manufacture of electrolytic condensers, the combination of the various process steps is new and results in forming a film which, in general, has characteristics different from those giving the best results either for preventing corrosion or for use in electrolytic condensers.

We have found that the film to serve the present object, has to be in itself (i. e., in the absence of the electrolyte) well adhering to the base metal on which it has been formed, and requires, especially during the formation, a great degree of elasticity. It has furthermore to maintain its original properties without the benefit of a film-maintaining electrolyte, which in the usual electrolytic condensers, due to the film formation on impaired portions of the film, provides for a more or less constant repair and rejuvenation of the film during the operation of the electrolytic condenser.

The films which we use in connection with the invention are comparatively thick and more or less porous. In making this type of film, we use a forming electrolyte which is distinctly acid, such as sulphuric, chromic or phosphoric acid, but preferably an organic acid, such as oxalic or formic acid. The above acids may be used alone, in combination, or with the addition of certain salts; however, the pH should be below 7, and usually considerably on the acid side. Generally we prefer such a concentration of acid, or of acid and salt, that the anions which are present are largely univalent ions. To accomplish this purpose the pH of the solution should be within rather narrow limits.

The film so formed contains some water and some organic anions, and is to be subjected to heat-treatment, which consists in heating the film to a temperature between 150° and 300° C., and preferably to about 250° C. This heat-treatment has three effects; first, it removes the water from the film; secondly, it removes from the film the organic material which goes off mainly as carbon dioxide and water; and thirdly, it has a baking effect, causing a better adherence of the film. Where chromic acid is used as a forming electrolyte, any residual chromic acid in the film also will volatilize under this treatment.

In the case of thick films, or where there is considerable amount of water left in the film it may be well to subject the film to a preliminary drying treatment at about 100° C., in order to permit the slow volatilization of the major portion of the water present, so as to avoid the destructive effects which might accompany a sudden generation of a large amount of steam.

The heat-treatment takes place for about one to three hours, but somewhat longer times are not injurious.

The film so obtained is somewhat sensitive to the presence of water, and to protect it against absorbing moisture, we prefer to impregnate same with a waterproofing compound.

For this purpose a wax, as paraffin, ceresine or the like, may be used, or a resin of which a solution is applied for the impregnation. In any case the impregnation has to be such, that the impregnating compound should fill the pores of the film, without forming on top of the oxide film, a second film of substantial thickness.

The films made according to the invention have very low power factors, even at high frequencies, and at the usual radio frequencies of 500 kilocycles to 5 megacycles, a power factor of the order of .25%; and even power factors as low as .1% have been obtained. At frequencies above 5 megacycles up to about 20 megacycles the loss appears somewhat greater, and usually of the order of .5%, but this may be due to inductive effects in the metal plates rather than an actual increase in the power factor of the film.

Not to impair such low power factor of the condenser, the impregnating compound used should also have a low power factor, and for this purpose we have found that dilute solutions of low-loss thermo-plastic materials, for example, benzol, naphtha or like solutions of metastyrene or coumarone-indene type of resin are excellently suited. The use of such material has the further advantage of eliminating any change in capacity, as there is no pressure applied to the material.

In the drawing forming part of the specification:

Figure 1 is a much enlarged cross section of a filmed electrode according to the invention, the relative thickness of the film being exaggerated for the sake of clarity;

Fig. 2 is a sectional side view of a trimmer condenser according to the invention;

Fig. 3 is a top view of the condenser of Fig. 2;

Fig. 4 is a cross section of a fixed condenser according to the invention, in which the second electrode is formed by a sprayed metal coating.

Referring to Figure 1, the electrode plate 1 is of a film-forming metal, preferably of aluminum, the thickness of which depends on the type of condenser for which it is used; 2 is the dielectric film, consisting of an oxide film which is comparatively thick, of the order of .0001 to .0005″, and somewhat porous; 3 indicates the impregnating material, which may also form an extremely thin protective skin 4 around the oxide film, the thickness of which, however, should be small compared with the thickness of the film.

To form the film on the aluminum, the aluminum is subjected to electrolytic formation. Such a formation takes place preferably in an organic acid having a pH at which the acid is largely dissociated into univalent anions. If oxalic acid is used, which is a very excellent forming electrolyte for this purpose, its pH is preferably less than 2.

The characteristics of the film produced in oxalic acid varies widely with the concentration of the oxalic acid and with the temperature. In solutions containing 2.5% by weight of oxalic acid and maintained at a temperature below 35° C., a yellowish colored film is formed on the aluminum which is extremely hard. The forming voltage used in this process is about 50-60 volts.

A film of quite similar characteristics can be obtained by using solutions containing less than 0.5% (by weight) oxalic acid and forming at a temperature of 90° C. or higher, at a voltage from 75-150 volts. In this high temperature, high-voltage formation, however, there is some danger of corrosion and other secondary reactions with the aluminum taking place. Therefore, where we desire to produce this hard yellow film we use as a rule the more concentrated solution at the lower temperature.

A relatively soft white or clear film can be produced in oxalic acid with a higher concentration, namely about 5%, and with a forming temperature of about 60-70° C., and a forming voltage of 40-50 volts.

For uses as in trimmer condensers, where the film has to stand both mechanical abrasions, and at the same time requires some flexibility, we usually prefer to combine the characteristics of both of these above films. This can be obtained, for example, by first forming the yellowish film on the aluminum, and then forming the white film underneath the yellow film. In this way we achieve a film of great surface hardness which withstands abrasions, and at the same time we have a relatively soft flexible film next to the soft flexible aluminum so that a moderate bending or other cold working on the metal does not cause cracks or other injury to the film.

In all the above cases we found that the thickness of the film and thus its capacity are largely determined by the current density used in formation and the duration of the formation. Thus it is the total ampere hours per square inch used in formation which determines the thickness and capacity of the film. For trimmer condensers we prefer to use a film approximately .0003″ thick and to obtain this film we pass current for a sufficient length of time to consume about 40 ampere minutes per square inch.

It should be well understood that the figures here given are only approximate, and that there are many contributing secondary effects which affect same. For example, at very high current density, the film may be corroded as fast as it is formed, so that an increase in the length of formation will not produce an appreciable increase in thickness. Similarly, at high temperatures (above 100° C.) the rate of dissolution of the film may be almost as great as the rate of formation.

After the aluminum oxide film has been thus formed, the filmed electrode is subjected to a heat-treatment, for the purpose previously stated, this treatment taking place at a temperature of 150° to 300° C., and for about two hours.

The formed and heat-treated electrode is then preferably rendered moisture-proof by proper impregnation, by a suitable impregnating medium, for example with a 20% solution of metastyrene resin or a 20% solution of coumarone-indene resin.

The impregnation is carried out by immersing the filmed electrode, preferably hot, in a vat or container containing the above solution. After an immersion for about 15 minutes the electrode is removed and the excess solution permitted to drip back in the tank. The wet film is dried with cloth, or centrifuged, or tumbled in a barrel of sawdust or other absorbent material to remove the excess solution. The porous oxide film thereby becomes well impregnated with the resin, without the resin forming thereupon a covering layer, except possibly a very thin skin.

Thermoplastic materials of the type just mentioned have very low dielectric losses, and as they apply no pressure on the dielectric layer, the dielectric loss of the condenser is not increased by their use, nor do they affect the capacity of the condenser in case of temperature changes.

We may also impregnate the film before baking, with a molten long-chain fatty acid, or with a colloidal dispersion of such acid in water. When the so-impregnated film is then baked at elevated temperature, the aliphatic acid will react with the surface of the aluminum oxide producing an insoluble ester unaffected by water. Examples of such acids are oleic, stearic, palmitic, abietic acids and the like.

The trimmer condenser shown in Figs. 2 and 3 is of the conventional type except that instead of using brass, copper, or iron for the flat plate 5, as is usually the case, aluminum is used therefor, and the dielectric instead of being formed of mica or similar dielectric, consists of the film 6, formed, heat-treated and preferably impregnated, in accordance with the invention.

In some designs of trimmer condensers, the flat plate is required to have some mechanical strength or resiliency, to a greater extent than is provided for by ordinary high-purity annealed aluminum generally used for electrolytic condenser electrodes, as otherwise the plate may be deformed slightly thus bringing about a change in capacity. For this reason, when using aluminum we prefer to use the so-called cold worked aluminum rather than the annealed aluminum. While the effects of alloy constituents on aluminum generally have a very marked effect on the dielectric properties of the films used for electrolytic condensers, we have found the surprising fact that the alloy of aluminum commonly called duralumin can be subjected to the above filming processes to produce films which within the limit of experimental error, apparently have the same characteristics as pure aluminum throughout the range of 500 kilocycles to 10 megacycles. By thus using duralumin we are able to give substantially the same desirable mechanical characteristics to the flat metal plates of trimmer condensers as they obtain in standard design by being of brass or phosphor bronze. It should be noted that the films produced on alloys which possess the physical properties of the films on pure aluminum, are usually somewhat discolored, so that the color of the films is not in all cases a guide to their quality.

The adjustable resilient plate 7, adjusting screw 8, and other parts of the condenser are of conventional design.

Trimmer condensers made in this manner have for the same size about three times the capacity of the usual mica trimmer condensers employing 1 mil thick mica. At the same time their dielectric strength (and at low field strengths their insulation resistance) favorably compare with those of mica condensers.

The power factor of such condensers for the usual radio frequencies 500 kilocycles to 5 megacycles is about .25%, and even lower power factors can be obtained.

Fig. 4 shows a fixed condenser element in which electrode 10 is of aluminum and has a film 11 formed thereon, heat-treated and preferably impregnated in accordance with the invention. To get an intimate contact with the film 11 the second electrode is formed by spraying a suitable metal layer 12 on top of same; this is preferably achieved by cold or hot spraying of metals like zinc, tin, silver, copper, and the like, although other methods of applying the metal layer can also be used.

While we have described our invention on hand of specific embodiments and given the preferred method of manufacturing same, we do not wish to be limited thereto, but desire the appended claims to be construed as broadly as permissible in view of the prior art.

What we claim is:

1. A combined electrode and dielectric layer for an adjustable condenser, comprising a conducting layer of film forming metal, a dielectric layer intimately adhering and baked to said conducting layer, said dielectric layer consisting of an oxide of said metal, and having a hard outer surface and being less hard and more elastic in its portion adjacent to the conducting layer.

2. A combined electrode and dielectric layer for an adjustable condenser, comprising an electrode plate of film forming metal, and a dielectric layer intimately adhering and baked to said plate, said dielectric layer consisting of a dry oxide of said metal and having a hard outer surface and being less hard and more elastic in its portion adjacent to the plate.

3. A combined electrode and dielectric layer for an adjustable condenser comprising an electrode plate of film forming metal, a dielectric layer intimately adhering and baked to said plate, said dielectric layer consisting of a dry and porous oxide film of said metal, which film is free from any traces of electrolyte, and has a thickness of .0001—.0005", said film having a hard outer surface and being less hard and more elastic in its portion adjacent to the plate.

PRESTON ROBINSON.
WILLIAM M. ALLISON.